United States Patent
Kroeger et al.

(10) Patent No.: US 11,325,716 B2
(45) Date of Patent: May 10, 2022

(54) INLET BULKHEAD WITH VENTILATION GROOVE

(71) Applicant: ROHR, INC., Chula Vista, CA (US)

(72) Inventors: Daniel Kroeger, San Diego, CA (US); Delbert N Hermosura, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 252 days.

(21) Appl. No.: 16/422,572

(22) Filed: May 24, 2019

(65) Prior Publication Data

US 2020/0369399 A1 Nov. 26, 2020

(51) Int. Cl.
| | | |
|---|---|---|
| *B64D 29/06* | (2006.01) | |
| *F01D 25/14* | (2006.01) | |
| *F01D 25/26* | (2006.01) | |
| *F02C 7/047* | (2006.01) | |

(52) U.S. Cl.
CPC ............. *B64D 29/06* (2013.01); *F01D 25/14* (2013.01); *F01D 25/26* (2013.01); *F02C 7/047* (2013.01); *F05D 2220/323* (2013.01); *F05D 2240/14* (2013.01)

(58) Field of Classification Search
CPC ......... B64D 29/00; B64D 29/06; F01D 25/14; F01D 25/26; F02C 7/047
See application file for complete search history.

(56) References Cited

U.S. PATENT DOCUMENTS

| | | | | |
|---|---|---|---|---|
| 5,088,277 | A  * | 2/1992 | Schulze | F02C 7/047 60/39.093 |
| 6,193,192 | B1 | 2/2001 | Porte | |
| 6,267,328 | B1 * | 7/2001 | Vest | B64D 15/04 239/599 |
| 6,920,958 | B2 | 7/2005 | Harrison | |
| 8,448,901 | B2 * | 5/2013 | Porte | B64D 15/04 244/134 B |
| 9,708,072 | B2 | 7/2017 | Lumbab et al. | |
| 10,160,552 | B2 * | 12/2018 | Crawford | B64D 29/00 |
| 2001/0003897 | A1 | 6/2001 | Porte et al. | |
| 2002/0139899 | A1 | 10/2002 | Porte | |
| 2020/0011243 | A1 * | 1/2020 | Chen | B64D 29/00 |

FOREIGN PATENT DOCUMENTS

WO  2009112743  9/2009

OTHER PUBLICATIONS

European Patent Office, European Search Report dated Jun. 3, 2020 in Application No. 19216732.8.

* cited by examiner

*Primary Examiner* — Craig Kim
(74) *Attorney, Agent, or Firm* — Snell & Wilmer L.L.P.

(57) ABSTRACT

A nacelle inlet may comprise a lip skin and a bulkhead mounted to the lip skin. The lip skin may define an orifice. The bulkhead may comprise a forward face, a first flange extending axially from an outer circumference of the forward face, and a ventilation groove formed in the forward face. The ventilation groove may be circumferentially aligned with the orifice.

16 Claims, 4 Drawing Sheets

INLET BULKHEAD WITH VENTILATION GROOVE

FIELD

The present disclosure relates to aircraft nacelles and, more particularly, to an inlet bulkhead having a ventilation groove.

BACKGROUND

A nacelle for a turbine engine typically includes an inlet, a fan cowl, a thrust reverser, and an exhaust section. The inlet may include a lip skin at the forward end of the inlet. While the lip skin may be employed to provide an aesthetically pleasing forward end component, it also needs to be able to withstand forces generated during flight and during unexpected events, such as a bird strike. To withstand these forces and remain aesthetically pleasing, the lip skins may be formed of dense, polishable materials such as, for example, stainless steel. The dense material of the lip skin tends to increase a weight of the lip skin and the nacelle inlet.

SUMMARY

A bulkhead for a nacelle inlet is disclosed herein. In accordance with various, the bulkhead may comprise a forward face and a first flange extending axially from an outer circumference of the forward face. A ventilation groove may be formed in the forward face.

In various embodiments, a first distance measured axially between an aft edge of the first flange and a plane normal to a center axis of the bulkhead is greater than a second distance measured axially between the plane and the aft edge of the first flange. The first distance is measured at a first location on the aft edge of the first flange and the second distance is measured at a second location on the aft edge of the first flange. The second location is circumferentially offset from the first location. The plane and a forwardmost point of the forward face are coplanar.

In various embodiments, the first location corresponds to a location of the ventilation groove and the second location is 45°, as measured about the center axis of the bulkhead, from the first location.

In various embodiments, a depth of the ventilation groove, as measured in an axial direction, increases in a radially outward direction. In various embodiments, a second flange extends axially from an inner circumference of the forward face.

In various embodiments, the ventilation groove comprises a first circumferential width proximate the outer circumference of the forward face and a second circumferential width proximate the inner circumference of the forward face.

In various embodiments, the ventilation groove is formed approximately 180°, as measured about a center axis of the bulkhead, from a mounting region of the forward face. In various embodiments, the ventilation groove is formed at a bottom of the forward face.

A nacelle inlet is also disclosed herein. In accordance with various embodiments, the nacelle inlet may comprise a lip skin defining an orifice and a bulkhead mounted to the lip skin. The bulkhead may comprise a forward face and a first flange extending axially from an outer circumference of the forward face. A ventilation groove is formed in the forward face. The ventilation groove may be circumferentially aligned with the orifice.

In various embodiments, a first distance measured axially between an aft edge of the first flange and a plane normal to a center axis of the bulkhead is different from a second distance measured axially between the plane and the aft edge of the first flange. The first distance is measured at a first location on the aft edge of the first flange and the second distance is measured at a second location on the aft edge of the first flange. The second location is circumferentially offset from the first location.

In various embodiments, the first location corresponds to a location of the ventilation groove, and the second location is 45°, as measured about the center axis of the bulkhead, from the first location.

In various embodiments, a first barrel is coupled to the first flange, and a second barrel is coupled to a second flange of the bulkhead. The second flange extends axially from an inner circumference of the forward face.

In various embodiments, a conduit may be configured to deliver a gas into a forward volume defined by the bulkhead and the lip skin. In various embodiments, the ventilation groove is formed at a bottom of the forward face.

In various embodiments, an outer flange of the lip skin is coupled to the first flange of the bulkhead. A first distance measured axially between an aft edge of the outer flange and a plane normal to a center axis of the bulkhead is greater than a second distance measured between the plane and the aft edge of the outer flange. The first distance is measured at a first location on the aft edge of the outer flange and the second distance is measured at a second location on the aft edge of the outer flange. The second location is circumferentially offset from the first location. The plane and a forwardmost point of the lip skin are coplanar.

A nacelle is also disclosed herein. In accordance with various embodiments, the nacelle may comprise a fan cowl and an inlet forward the fan cowl. The inlet may comprise a bulkhead defining a ventilation groove, and a lip skin mounted to the bulkhead. The lip skin defines an orifice circumferentially aligned with the ventilation groove.

In various embodiments, the bulkhead further comprises a forward face and a first flange extending axially from an outer circumference of the forward face.

In various embodiments, a first distance measured between an aft edge of the first flange and a plane normal to a center axis of the bulkhead is different from a second distance measured between the plane and the aft edge of the first flange. The first distance is measured at a first location on the aft edge of the first flange and the second distance is measured at a second location on the aft edge of the first flange. The second location is circumferentially offset from the first location.

In various embodiments, the first location corresponds to a location of the ventilation groove and the second location is 45°, as measured about the center axis of the bulkhead, from the first location.

In various embodiments, an outer flange of the lip skin is coupled to the first flange of the bulkhead. A first distance measured between an aft edge of the outer flange and a plane normal to a center axis of the bulkhead is different from a second distance measured between the plane and the aft edge of the outer flange. The first distance is measured at a first location on the aft edge of the outer flange and the second distance is measured at a second location on the aft edge of the outer flange. The second location is circumferentially offset from the first location.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "a radially outward direction" refers to a direction away from a center axis. As used herein, "a radially inward direction" refers to a direction toward from a center axis. A first component that is "radially inward" of a second component means that the first component is positioned closer to a center axis than the second component. A first component that is "radially outward" of a second component means that the first component is positioned a greater distance from a center axis than the second component.

Figure 1:
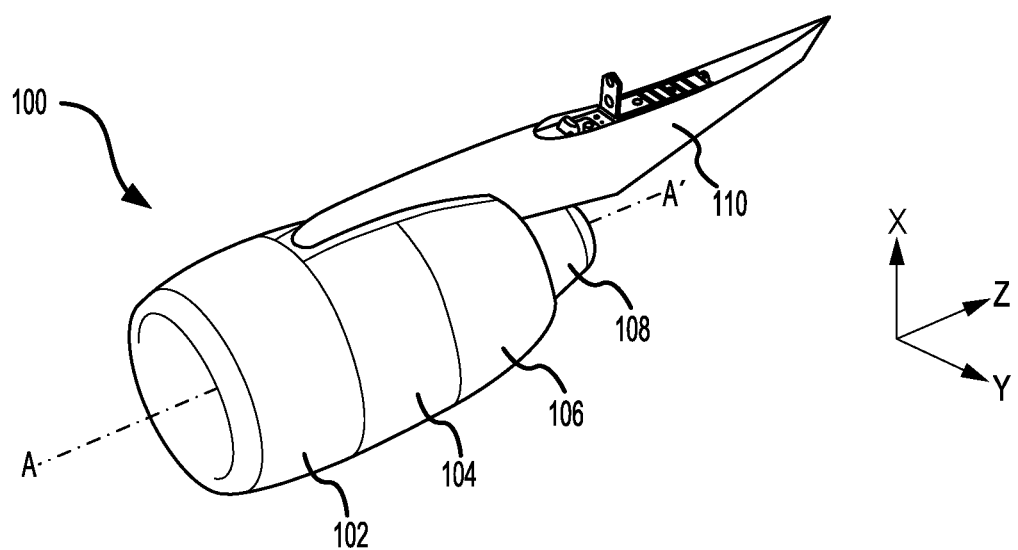
FIG. 1 illustrates a perspective view of a nacelle, in accordance with various embodiments.

Referring to FIG. 1, a nacelle 100 for a propulsion system is illustrated, in accordance with various embodiments. Nacelle 100 may comprise an inlet 102 (also referred to as a nacelle inlet), a fan cowl 104, a thrust reverser 106, and an exhaust system 108. Nacelle 100 provides smooth aerodynamic surfaces for airflow around and into a gas turbine engine housed within nacelle 100. Nacelle 100 may be coupled to a pylon 110. Pylon 110 may be configured to mount nacelle 100 and the gas turbine engine surrounded by nacelle 100 to an aircraft wing or aircraft body.

Figure 2A:
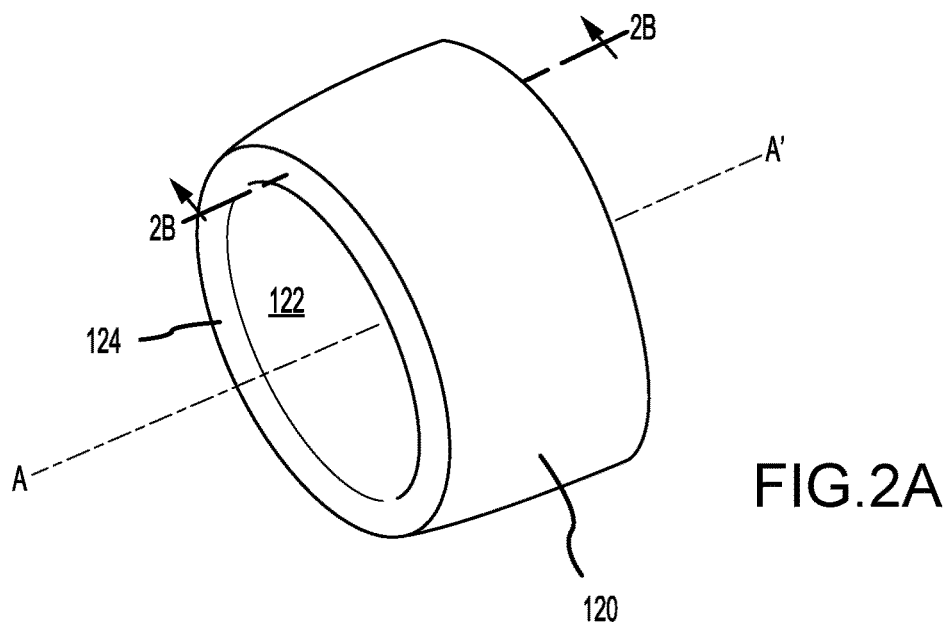
FIG. 2A illustrates a perspective view of a nacelle inlet, in accordance with various embodiments.
Figure 2B:
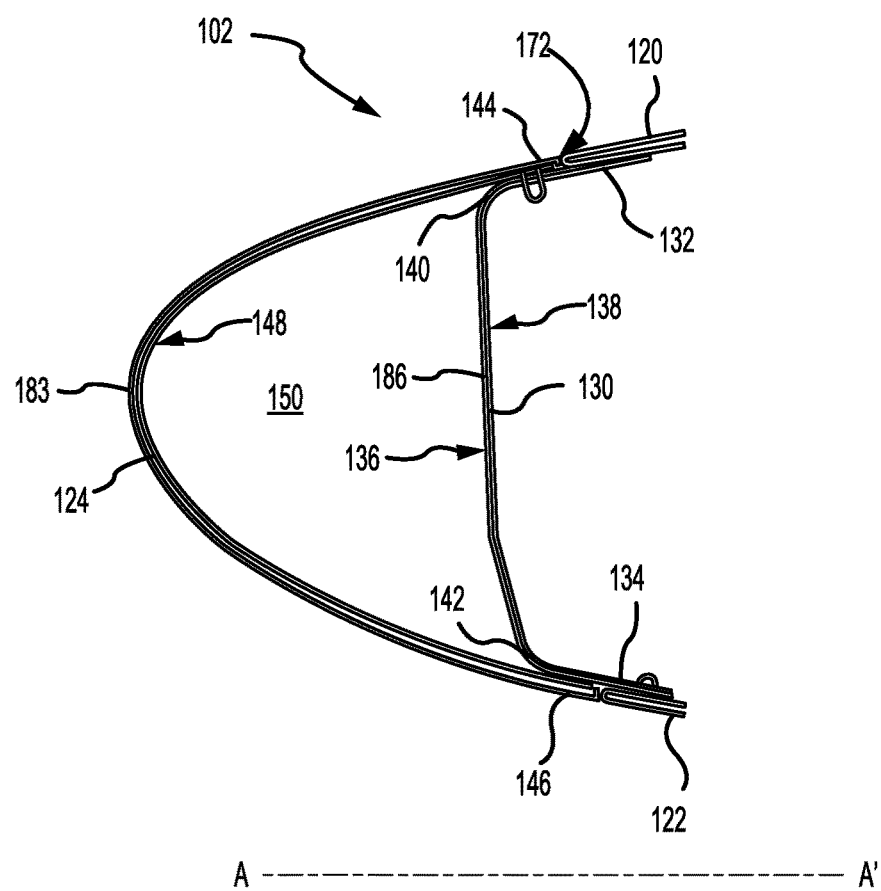
FIG. 2B illustrates a cross-section view of a nacelle inlet taken along the line 2B-2B in FIG. 2A, in accordance with various embodiments.

Referring to FIGS. 2A and 2B, nacelle inlet 102 is illustrated, in accordance with various embodiments. In various embodiments, inlet 102 may include a first (or outer) barrel 120 and a second (or inner) barrel 122 located radially inward of first barrel 120. Inlet 102 further includes a lip skin 124 and a bulkhead 130. First barrel 120, second barrel 122, lip skin 124, and bulkhead 130 may each comprise a generally annular structure, which may be disposed around a central longitudinal axis A-A' (referred to as center axis A-A' of bulkhead 130). Center axis A-A' extends in an axial, forward to aft direction. As used herein, the term "axial" refers to directions parallel to center axis A-A', the term "circumferential" refers to direction about center axis A-A', and the term "radial" refers to directions normal to center axis A-A'.

Bulkhead 130 includes a first (or outer) flange 132 and a second (or inner) flange 134. Bulkhead 130 further comprises a forward face 136 and an aft face 138 opposite forward face 136. Forward face 136 is oriented in a generally forward direction. Aft face 138 is oriented away from forward face 136, in a generally aft direction. In various embodiments, forward face 136 may form a convex curve and aft face 138 may form a concave curve. First flange 132 extends axially and aftward from an outer circumference 140 of forward face 136. Second flange 134 extends axially and aftward from an inner circumference 142 of forward face 136.

In various embodiments, first barrel 120 and an outer flange 144 of lip skin 124 may be coupled, or mounted, to first flange 132 of bulkhead 130. Second barrel 122 and an inner flange 146 of lip skin 124 may be coupled, or mounted, to second flange 134 of bulkhead 130. In various embodiments, forward face 136 of bulkhead 130 and an aft surface 148 of lip skin define a forward volume 150. Forward volume 150 may be located forward first and second barrels 120, 122.

Figure 3:
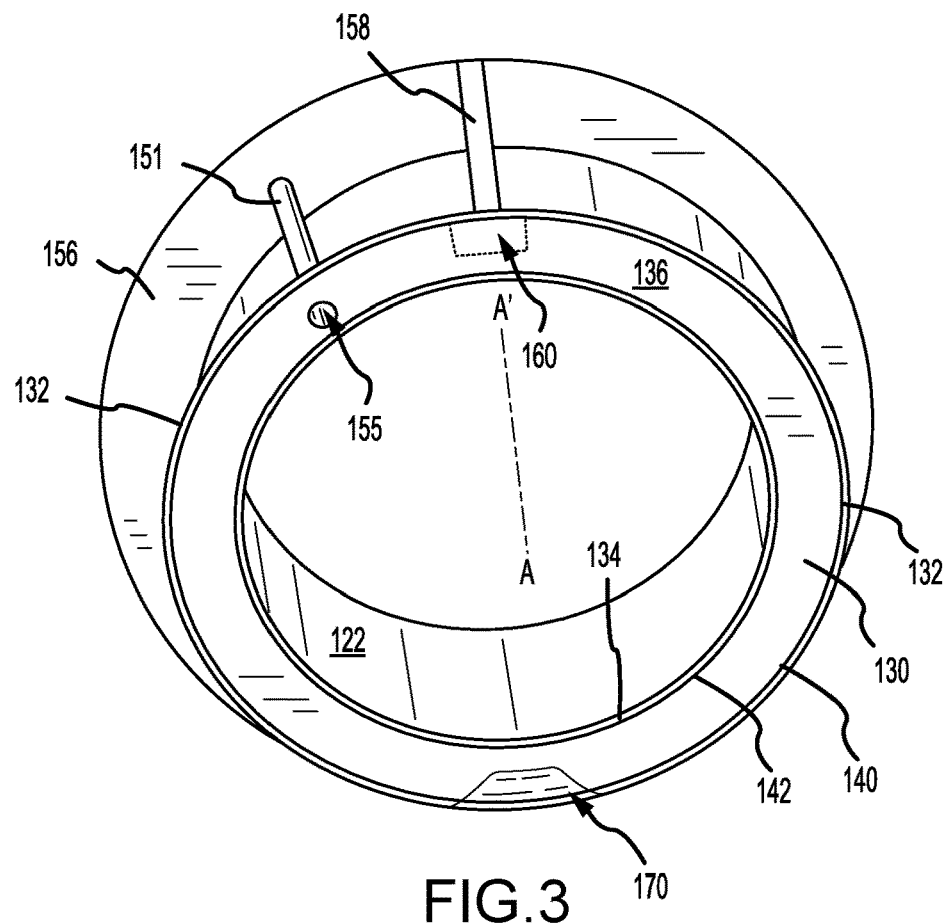
FIG. 3 illustrates a perspective view of an inlet bulkhead having a ventilation groove, in accordance with various embodiments.

Referring to FIG. 3, bulkhead 130 is illustrated with lip skin 124 and first barrel 120 removed for clarity. With combined reference to FIG. 2B and FIG. 3, in various embodiments, forward volume 150 may receive a heated gas flow to remove ice and/or deter ice from forming on lip skin 124. In various embodiments, the heated gas is provided to forward volume 150 via conduit 151. Stated differently, conduit 151 is fluidly coupled to forward volume 150. In various embodiments, bulkhead 130 may define a fluid input 155 configured to receive conduit 151. In various embodiments, the heated gas provided by conduit 151 may be bled from a compressor section of a gas turbine engine. In various embodiments, conduit 151 may extend between bulkhead 130 and a second bulkhead 156 aft of bulkhead 130. In this regard, in various embodiments, bulkhead 130 may comprise a forward bulkhead of inlet 102.

Figure 4:
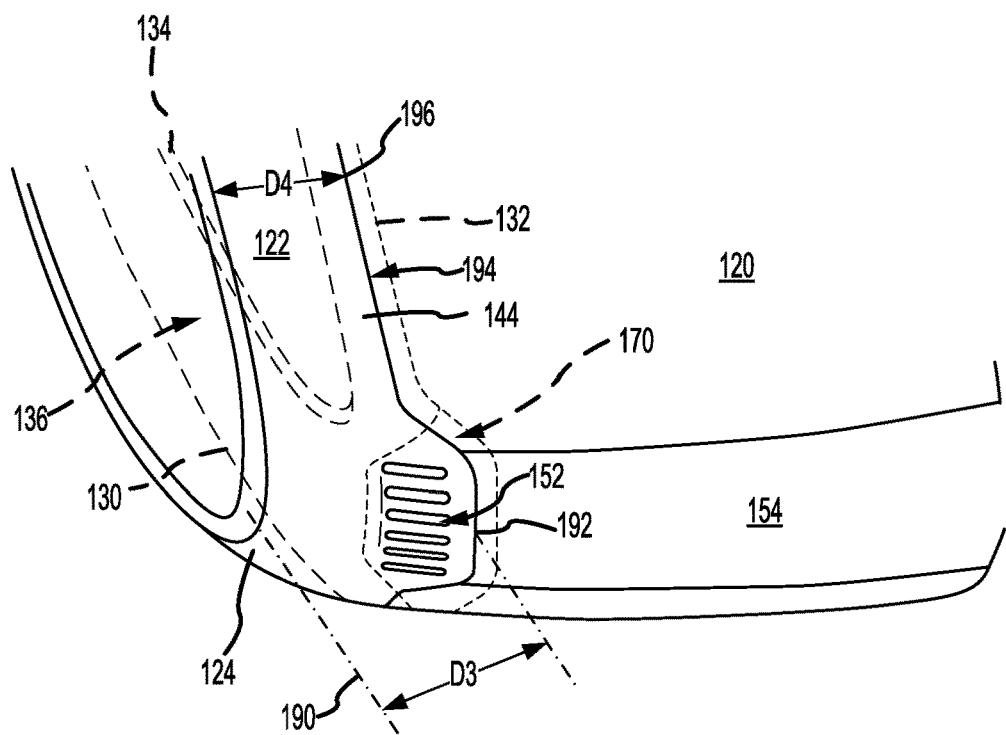
FIG. 4 illustrates a perspective view of a lip skin located over an inlet bulkhead having a ventilation groove, in accordance with various embodiments.

Referring to FIG. 4, and with continued reference to FIG. 2B, lip skin 124 may define one or more orifice(s) 152.

Orifices 152 may be formed in outer flange 144 of lip skin 124. Hot gas may exit forward volume 150 via orifices 152. In various embodiments, first barrel 120 includes a heat resistant panel 154 proximate orifices 152. Heat resistant panel 154 may be aft of and circumferentially aligned with orifices 152. Heat resistant panel 154 may comprise a different, more heat resistant material as comparted to the other material of first barrel 120. In various embodiments, orifices 152 are formed in a bottom portion of outer flange 144. As used herein, a "bottom portion of outer flange 144" refers to the portion of outer flange 144 that is closest to the ground when the aircraft is taxiing on the ground. For example, in an underwing mounted nacelle, the bottom portion of outer flange 144 is located distal to the wing and 180° from the pylon. In a nacelle side mounted to a fuselage, the bottom portion of outer flange 144 is located 90° from the pylon. Locating orifices 152 in a bottom portion of outer flange allows fluid, which may accumulate from, for example, melting ice, to exit (i.e., flow out) forward volume 150.

With combined reference to FIG. 3 and FIG. 4, in accordance with various embodiments, bulkhead 130 includes a ventilation groove 170. Ventilation groove 170 is formed in forward face 136 of bulkhead 130. The location of ventilation groove 170 corresponds to the location of orifices 152. Stated differently, ventilation groove 170 is radially inward of orifices 152 and circumferentially aligned with orifices 152.

Ventilation groove 170 is formed in a bottom portion of forward face 136. As used herein, a "bottom portion of forward face 136" refers to the portion of forward face 136 that is closest to the ground when the aircraft is taxing on the ground. For example, in an underwing mounted nacelle, the bottom portion of forward face 136 is located distal to the wing and 180° from the pylon, as measured about center axis A-A'. In a nacelle side mounted to a fuselage, the bottom portion of forward face 136 is located 90° from the pylon as measured about center axis A-A'. In various embodiments, a mounting strut 158 may be coupled to bulkhead 130. In various embodiments, ventilation groove 170 may be 180°, as measured about center axis A-A', from a mounting region 160 of forward face 136. In accordance with various embodiments, mounting region 160 comprises the area of forward face 136 that is closest to mounting strut 158 and to pylon 110, with momentary reference to FIG. 1.

Figure 5:
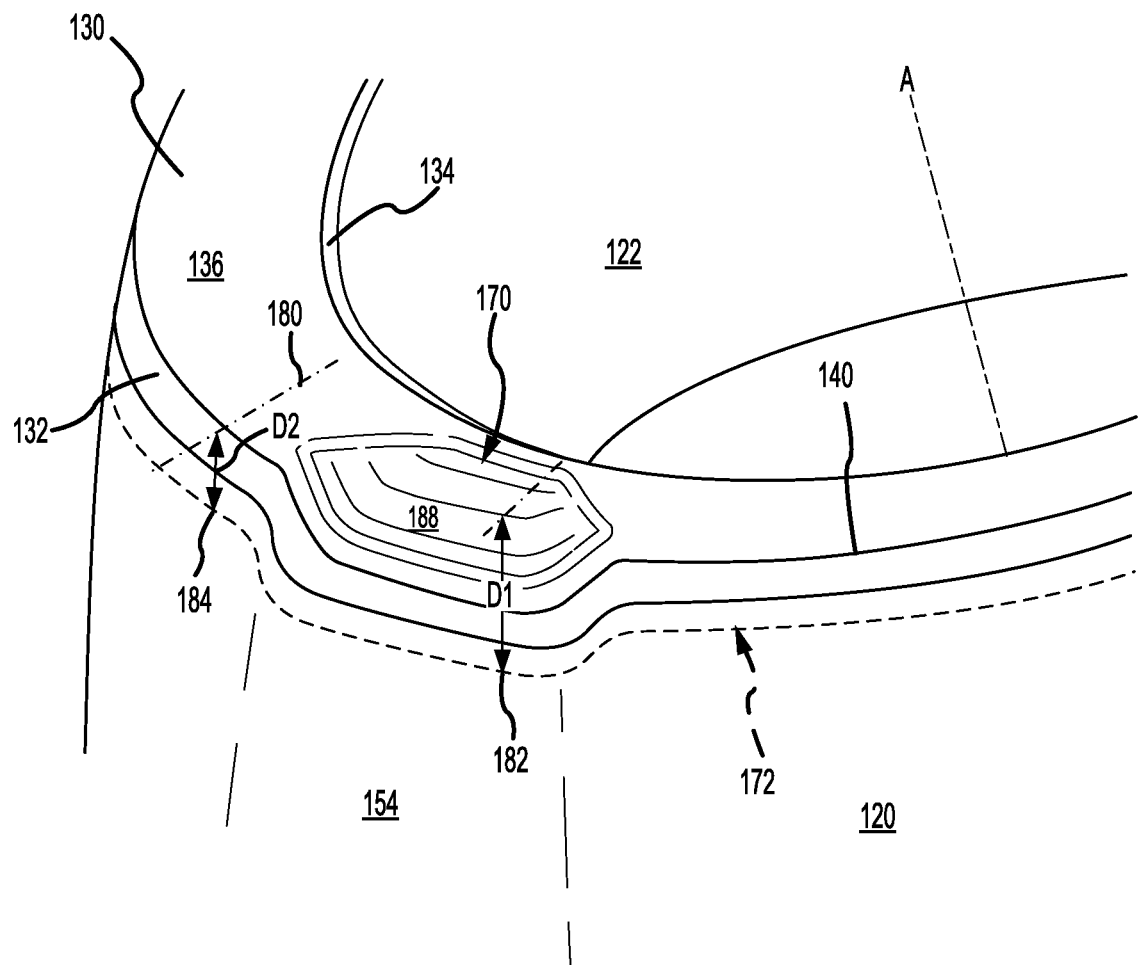
FIG. 5 illustrates a perspective view of a ventilation groove of an inlet bulkhead, in accordance with various embodiments.

With reference to FIG. 5, ventilation groove 170 is illustrated with lip skin 124 removed for clarity. In accordance with various embodiments, an aft edge 172 of first flange 132 may be axially extended at ventilation groove 170. For example, a first distance D1 measured axially at a first location 182 on aft edge 172 of first flange 132 is greater than a second distance D2 measured axially at a second location 184 on aft edge 172. First location 182 corresponds to (i.e., is circumferentially aligned with) ventilation groove 170. Second location 184 is circumferentially offset from ventilation groove 170. First distance D1 is measured between a plane 180 and aft edge 172 of first flange 132 at first location 182. Second distance D2 is measured between plane 180 and aft edge 172 at second location 184. Plane 180 is an imaginary plane that is normal to center axis A-A'. Plane 180 may extend radially from, and/or may be defined by, a forwardmost point 186 of forward face 136, with momentary reference to FIG. 2B. Stated differently, plane 180 and forwardmost point 186 may be coplanar. In various embodiments, second location 184 may be between 15° and 180°, as measured about center axis A-A', from first location 182. In various embodiments, second location 184 may be 45°, as measured about center axis A-A', from first location 182.

In various embodiments, a depth of ventilation groove 170, as measured in an axial direction between plane 180 and a floor 188 of ventilation groove 170, increases in a radially outward direction. Stated differently, a depth of ventilation groove 170 proximate outer circumference 140 is greater than a depth of ventilation groove 170 more proximate inner circumference 142. In various embodiment, a width of ventilation groove 170 proximate outer circumference 140 of forward face 136 is greater than a width of ventilation groove 170 proximate inner circumference 142 of forward face 136. The width of ventilation groove 170 is measured circumferentially about center axis A-A'.

Returning to FIG. 4, bulkhead 130 having ventilation groove 170 may allow an axial length of outer flange 144 of lip skin 124 to be reduced. In various embodiments, a distance D3 measured axially at a first location 192 on an aft edge 194 of outer flange 144 is greater than a distance D4 measured axially at a second location 196 on aft edge 194. First location 192 corresponds to (i.e., is circumferentially aligned with) orifices 152 and ventilation groove 170. Second location 196 is circumferentially offset from orifices 152 and ventilation groove 170. Distance D3 is be measured between an imaginary plane 190 and aft edge 194 of outer flange 144 at first location 192. Distance D4 is measured between imaginary plane 190 and aft edge 194 of outer flange 144 at second location 196. Imaginary plane 190 is normal to center axis A-A' and may extend from, and/or may be defined by, a forwardmost point 183 of lip skin 124, with momentary reference to FIG. 2B. Reducing an axial length of lip skin 124 tends to reduce the material volume of lip skin 124, which tends to decrease an overall weight of inlet 102.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A bulkhead for a nacelle inlet, the bulkhead comprising:
a forward face;
a first flange extending axially from an outer circumference of the forward face;
a ventilation groove formed in a bottom portion of the forward face; and
a fluid input formed through the forward face, wherein the ventilation groove is circumferentially offset about a center axis of the bulkhead from the fluid input;
wherein a first distance measured axially between an aft edge of the first flange and a plane normal to the center axis of the bulkhead is greater than a second distance measured axially between the plane and the aft edge of the first flange, wherein the first distance is measured at a first location on the aft edge of the first flange and the second distance is measured at a second location on the aft edge of the first flange, the second location being circumferentially offset from the first location, and wherein the plane and a forwardmost point of the forward face are coplanar.

2. The bulkhead of claim 1, wherein the first location corresponds to a location of the ventilation groove and the second location is 45° as measured about the center axis of the bulkhead from the first location.

3. The bulkhead of claim 1 wherein a depth of the ventilation groove as measured in an axial direction increases in a radially outward direction.

4. The bulkhead of claim 1, further comprising a second flange extending axially from an inner circumference of the forward face.

5. The bulkhead of claim 4, wherein the ventilation groove comprises a first circumferential width proximate the outer circumference of the forward face and a second circumferential width proximate the inner circumference of the forward face.

6. The bulkhead of claim 1, wherein the ventilation groove is formed approximately 180° as measured about the center axis of the bulkhead from a mounting region of the forward face.

7. A nacelle, comprising:
a fan cowl; and
an inlet forward the fan cowl, the inlet comprising:
a bulkhead including a forward face and a first flange extending axially from an outer circumference of the forward face, wherein a ventilation groove is formed in the forward face;
a lip skin mounted to the bulkhead, wherein an orifice is formed through an outer flange of the lip skin, the outer flange being located at an outer circumference of the lip skin, and wherein the orifice is circumferentially aligned with the ventilation groove;
an outer barrel located aft of the lip skin; and
an inner barrel radially inward of the outer barrel and aft of the lip skin.

8. A nacelle inlet, comprising:
a lip skin including an outer flange and an inner flange, the outer flange being located at an outer circumference of the lip skin and the inner flange being located at an inner circumference of the lip skin, wherein an orifice is formed through the outer flange of the lip skin; and
a bulkhead mounted to the lip skin, the bulkhead comprising:
a forward face;
a first flange extending axially from an outer circumference of the forward face; and
a ventilation groove formed in the forward face, wherein the ventilation groove is circumferentially aligned with the orifice;
wherein the outer flange of the lip skin is coupled to the first flange of the bulkhead, and wherein a first distance measured axially between an aft edge of the outer flange and a plane normal to a center axis of the bulkhead is greater than a second distance measured between the plane and the aft edge of the outer flange, the first distance being measured at a first location on the aft edge of the outer flange and the second distance being measured at a second location on the aft edge of the outer flange, wherein the second location is circumferentially offset from the first location, and wherein the plane and a forwardmost point of the lip skin are coplanar.

9. The nacelle inlet of claim 8, wherein a third distance measured axially between an aft edge of the first flange and the plane is different from a fourth distance measured axially between the plane and the aft edge of the first flange, and wherein the third distance is measured at a third location on the aft edge of the first flange and the fourth distance is measured at a fourth location on the aft edge of the first flange, the fourth location being circumferentially offset from the third location.

10. The nacelle inlet of claim 9, wherein the third location corresponds to a location of the ventilation groove and the fourth location is 45° as measured about the center axis of the bulkhead from the third location.

11. The nacelle inlet of claim 8, wherein the ventilation groove is formed at a bottom of the forward face.

12. The nacelle inlet of claim 10, further comprising:
a first barrel coupled to the first flange; and a second barrel coupled to a second flange of the bulkhead, wherein the second flange extends axially from an inner circumference of the forward face.

13. The nacelle inlet of claim 12, further comprising a conduit configured to deliver a gas into a forward volume defined by the bulkhead and the lip skin.

14. The nacelle of claim 7, wherein the outer flange of the lip skin is coupled to the first flange of the bulkhead, and wherein a first distance measured between an aft edge of the outer flange and a plane normal to a center axis of the bulkhead is different from a second distance measured between the plane and the aft edge of the outer flange, and wherein the first distance is measured at a first location on the aft edge of the outer flange and the second distance is measured at a second location on the aft edge of the outer flange, the second location being circumferentially offset from the first location.

15. The nacelle of claim 7, wherein a first distance measured between an aft edge of the first flange and a plane normal to a center axis of the bulkhead is different from a second distance measured between the plane and the aft edge of the first flange, and wherein the first distance is measured at a first location on the aft edge of the first flange and the second distance is measured at a second location on the aft edge of the first flange, the second location being circumferentially offset from the first location.

16. The nacelle of claim 15, wherein the first location corresponds to a location of the ventilation groove and the second location is 45° as measured about the center axis of the bulkhead from the first location.

\* \* \* \* \*